R. J. MacKENZIE AND L. L. HAAS.
SILENCER.
APPLICATION FILED MAY 16, 1919.
Reissued Feb. 22, 1921.
15,049.
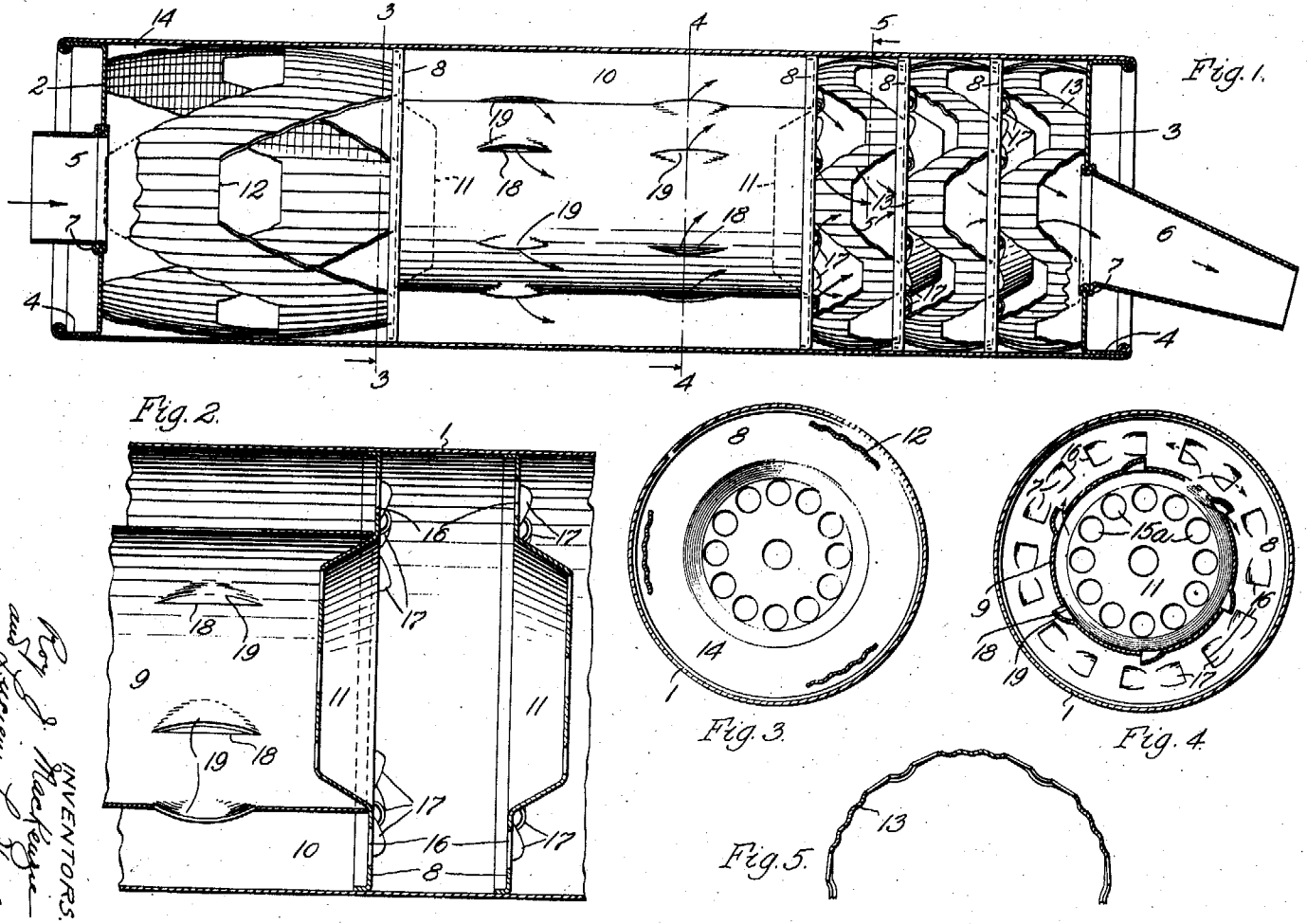
INVENTORS.
Roy J. MacKenzie
and Lucien L. Haas,
By Wilkelmer Parker
ATTORNEYS.

UNITED STATES PATENT OFFICE.

ROY J. MACKENZIE AND LUCIEN L. HAAS, OF BUFFALO, NEW YORK, ASSIGNORS TO BUFFALO PRESSED STEEL COMPANY, OF BUFFALO, NEW YORK.

SILENCER.

15,049. Specification of Reissued Letters Patent. Reissued Feb. 22, 1921.

Original No. 1,278,965, dated September 17, 1918, Serial No. 116,720, filed August 24, 1916. Application for reissue filed May 16, 1919. Serial No. 297,670.

*To all whom it may concern:*

Be it known that we, ROY J. MACKENZIE and LUCIEN L. HAAS, citizens of the United States, residing at Buffalo, in the county of Erie and State of New York, have invented new and useful Improvements in Silencers, of which the following is a specification.

This invention relates to mufflers or silencers such as are connected with the exhausts of internal combustion engines for reducing the noise incident to the explosions. These devices ordinarily comprise a casing through which the exhaust gases from the engine pass, and baffles of some sort in the casing which intercept the gases or prevent the direct flow of the same through the casing.

One object of this invention is to produce a practical and efficient silencer of this character which will give the maximum silencing effect with the minimum back pressure and which is so constructed that the parts can be manufactured and assembled with the minimum expense and labor and so that the parts can expand and contract freely under the changes in temperature to which they are subjected in use while nevertheless being held firmly in place and prevented from rattling. Other objects are to produce a construction enabling the parts of a silencer to be made at small expense from sheet metal and secured together without the use of bolts or other additional fastening devices; also to improve the construction of silencers in other respects hereinafter specified.

In the accompanying drawings:

Figure 1 is a longitudinal sectional elevation of a silencer embodying the invention.

Fig. 2 is an enlarged fragmentary section thereof, showing the baffles in section and the spacing pieces removed.

Figs. 3 and 4 are transverse sectional elevations thereof on lines 3—3 and 4—4, Fig. 1, respectively, looking in the directions indicated by the arrows.

Fig. 5 is a fragmentary transverse sectional elevation thereof on line 5—5, Fig. 1, in the direction indicated by the arrows.

The silencer is preferably composed of a cylindrical open-ended sheet metal body or housing shell 1, ends or heads 2 and 3 which may also, if desired, be made of sheet metal, and baffles, shells, or other sound-deadening devices, arranged within the body or housing shell and held in place by the shell and the heads 2 and 3. The parts of the silencer are secured together and held in place relatively to each other by spinning or turning over the ends of the outer shell in such a manner that the turned over portions of the outer shell will engage the circumferential portions of the ends or heads and will press them inwardly against the internal sound-deadening devices of the muffler. By securing together the parts of a silencer in this manner the pressure which is exerted against the end portions of the outer shell or body to turn over the metal, also acts on the heads or ends of the muffler to push them inwardly toward each other and against the internal sound-deadening devices, so that all of the parts of the muffler are firmly secured in their proper positions by a single operation. The turned-over end portions not only securely hold all of the parts of the muffler together, but also form a substantially gas-tight joint between the outer shell and the ends or heads of the silencer, so that the necessity for employing separate means to hold the parts together and to produce a gas-tight joint is eliminated. This structure also eliminates the use of bolts for securing together the parts of the silencer and eliminates the possibility of damage to the silencer due to loosening of nuts or bolts. By means of this construction the cost of production of the silencers is greatly reduced, since by the single operation of spinning the metal of an end of the outer shell over the head or end of a muffler the internal parts of the silencer are secured in place, the ends or end is secured in place, and a substantially gas-tight joint is formed between the outer shell of the muffler and the end or ends thereof.

In the construction shown in the drawings the ends or heads of the muffler are provided with marginal flanges 4, over which the metal of the outer shell is spun or turned. 5 and 6 indicate respectively inlet and discharge tubes or connections on the opposite ends of the casing. These tubes may be fixed in holes in the ends of the casing in any suitable manner, for example, by providing beads 7 on the tubes and flanging or spinning the ends of the tubes to clamp the edges of the holes in the heads tightly between the beads and flanges.

Internal sound-deadening devices of any desired construction may be used in connection with the silencer, those shown in the accompanying drawings being constructed as follows:

8 represents baffles or plates, of which there are a plurality arranged crosswise in the casing at suitable intervals, and 9 is an inner or silencing tube or cylinder extending lengthwise in the casing between two of the baffle plates and forming an annular space 10 in the casing around the inner tube. The baffle plates which are preferably sheet metal stampings, are formed with dished or frusto-conical central portions 11 and the two baffle plates at the ends of the silencing tube 9 are oppositely arranged with their dished central portions extending into the ends of the tube whereby the latter is held in place.

The baffle plates 8 are spaced from each other and from the ends of the casing by spacing rings or devices 12 and 13 which are preferably formed by zig-zag strips of sheet metal bent into and secured in circular or ring shape. The walls of these rings are corrugated lengthwise and are bowed so that the spacing rings are of smaller diameter at their ends than between their ends. The spacing devices bear at their ends against the baffle plates, or against the baffle plates and ends of the casing in the case of the two devices located at the ends of the casing, and bear between their ends against the cylindrical wall of the casing. When the parts are placed in the casing and the ends of the casing spun over the circumferential portions of the heads 2 and 3 to secure the latter, the spacing devices are compressed endwise and bulged or expanded crosswise so as to fit snugly in the casing and bear firmly against the baffle plates and ends of the casing, and the extent of this compression is determined as required by the amount which the ends of the casing are spun over. The spacing devices are resilient and act as springs to hold the baffle plates and silencing tube in connection and in place in the casing and to permit expansion and contraction of the parts due to changes in temperature without allowing the parts to become loose or to rattle. In assembling the parts it is thus only necessary to place them in the proper order in the casing and spin over the ends of the casing to secure them, and no bolts or other fastening devices are required. This greatly simplifies the labor and expense of assembling and reduces the number and cost of the parts. The spacing device 12 between the inlet end of the casing and the first baffle plate is ordinarily longer than the other spacing devices and provides a large expansion chamber 14 for the gases in advance of the silencing tube. The openings between the staggered points at opposite ends of the spacing devices permit the passage of gases, and the spacing devices therefore also act as silencing devices or baffles to the flow of the gases.

The baffle plate and silencing tube 9 are provided with holes or openings for the passage of the gases, the number and arrangement of the holes being such as to break up the gases into numerous small streams which flow in different or opposing directions and more or less intercept or conflict with each other, thereby resulting in a thorough breaking up and churning of the gases in the casing. As shown, the baffle plate at the inlet end of the inner tube 9 has holes 15, which may be of any suitable number and size, in its central portion so as to direct the gases into the inner tube, and the other baffle plates are similarly provided with holes 15[a] in their central portions and in addition are provided in their outer portions with two series of slits 16 and partially punched-out parts or vanes 17 which face in opposite directions and cause the streams of gases passing through the slits to flow in opposite or conflicting directions in the casing. The inner tube is also provided with two or more circumferential rows of analogous slits 18 and vanes 19, the vanes in one series facing oppositely to those of the next series so as to cause the streams of gases passing through the slits to whirl in opposite directions in the space 10 around the silencing tube.

The number and spacing of the baffle plates and the lengths of the spacing devices and of the silencing tube may be varied to suit different engines, the number and proportioning of the parts depending upon the requirements of the engines with which the silencers are to be used. Likewise the number and arrangement of the holes and vanes of the baffle plates and silencing tube may also differ more or less in different silencers as may be required to give the best results.

The structure described for securing the ends or heads of a silencer in place has the further advantage that the heads are secured in place throughout their peripheral portions, so that there is an extended bearing surface which resists the force acting on the heads of the silencer when in use. This makes it possible to make the heads of lighter metal, so that, for example, the heads can be stamped out of sheet metal. The bent-over portions of the outer shell also form a reinforcing or strengthening bead at the ends of the silencer which resists the radial pressure at the ends of the outer shell.

We claim as our invention:

1. A silencer comprising a casing, baffles therein providing passages for gases, and spacing devices arranged between the baffles consisting of compressible and expansible rings which bear at their ends against said baffles and between their ends against the walls of the casing.

2. A silencer comprising a casing, baffles therein providing passages for gases, and spacing devices arranged between the baffles and between the ends of the casing and the adjacent baffles, said spacing devices consisting of compressible and expansible rings which bear at their ends against said baffles and the ends of the casing and between their ends against the walls of the casing.

3. A silencer comprising a casing, spaced baffles therein providing passages for gases, and devices for spacing the baffles in the casing each consisting of an annular zig-zag strip which is bowed longitudinally.

4. A silencer comprising a casing, spaced baffles therein providing passages for gases, and devices for spacing the baffles in the casing each consisting of an annular zig-zag strip which is corrugated longitudinally and is bowed outwardly between its ends toward the walls of the casing.

5. A silencer comprising a casing, spaced baffles therein providing passages for gases, and a tube which is arranged lengthwise in said casing between two of said baffles and forms an annular space in the casing, said tube having passages for the gases and parts which cause the gases to whirl in opposite directions in said annular passage.

6. A silencer comprising a casing, spaced baffles therein providing passages for gases, and a tube which is arranged lengthwise in said casing between two of said baffles and forms an annular space in the casing, said tube having passages for the gases and said tube and baffles having parts which cause the gases to whirl in opposite directions in the casing.

7. A silencer comprising a casing, spaced baffles therein providing passages for gases, a tube which is arranged lengthwise in said casing between two of said baffles and forms an annular space in the casing, and means for pressing said baffles yieldingly against the ends of said tube.

8. A silencer comprising a casing, spaced baffles therein providing passages for gases, a tube which is arranged lengthwise in said casing between two of said baffles and forms an annular space in the casing, said baffles having projecting portions entering the ends of said tube, and means for pressing said baffles yieldingly toward the ends of said tube for holding the parts firmly together.

9. A silencer comprising a casing having a body and heads, baffles in the casing, yielding means for spacing the baffles and yieldingly resisting movement of said baffles toward each other, and means at one end of the casing for forcing one of said heads inwardly to compress the parts in the casing between the heads of the casing.

10. A silencer comprising a casing having a body and heads, baffles in the casing, and yielding means for spacing the baffles and yieldingly resisting movement of said baffles toward each other, one end of said body being spun over for securing the adjacent head on the casing and compressing the parts in the casing between the heads of the casing.

11. A silencer comprising a casing, and spaced baffles in the casing providing passages for gases, said baffles consisting of sheet metal plates having perforated dished central portions, and surrounding outer portions having openings therethrough and vanes adjacent said openings which face alternately in substantially opposite tangential directions for causing the gases to whirl in opposite directions in the casing.

12. A silencer comprising a casing, baffles therein providing passages for gases, and compressible and expansible devices arranged between said baffles and acting to space said baffles and yieldingly resist relative movement thereof, and means for holding the parts with said devices under compression.

13. A silencer comprising a casing, baffles therein providing passages for gases, and compressible and expansible devices arranged between said baffles and acting to space said baffles and yieldingly resist relative movement thereof, and means for holding the parts with said devices under compression, said devices also providing passages for the gases and acting as baffles.

14. A silencer comprising an outer sheet metal shell, heads arranged in said shell adjacent to the ends thereof, a sound-deadening device in said shell between said heads, and spun-over end portions on said shell which extend inwardly with regard to said shell and engage said heads for holding the same in place and for forming a substantially gas-tight joint therewith, said spun-over end portions serving to hold said heads in engagement with said sound-deadening devices.

15. A silencer comprising an outer sheet metal shell, heads arranged in said shell adjacent to the ends thereof, a sound-deadening device in said shell and having parts engaging said heads and held in place by said heads, and spun-over end portions on said shell which extend inwardly with regard to said shell and which engage said heads for holding the same in place and for pressing said heads against said sound-deadening device, said spun-over end portions holding all of the parts of the silencer together.

16. A silencer comprising a cylindrical body, a head arranged in one end of said body and having an annular outwardly extending flange extending substantially parallel with said body, sound-deadening devices in said body engaged and held in place by said head, and an annular turned over portion on said end of said body which extends over the end of said flange throughout the periphery thereof and presses said head against said sound-deadening devices and forms a substantially gas-tight joint between said head and said body.

Witness our hands, this 13th day of May, 1919.

ROY J. MACKENZIE.
LUCIEN L. HAAS.

Witnesses:
MARCELLA BUSCHER,
H. C. LANOSK.